Sept. 11, 1951     A. T. RIDGEWAY     2,567,784

PIPE THREADING MACHINE

Filed Dec. 2, 1947

*Inventor*

Allen T. Ridgeway

By *Clarence A. O'Brien and Harvey B. Jackson*

*Attorneys*

Patented Sept. 11, 1951

2,567,784

UNITED STATES PATENT OFFICE 2,567,784

PIPE THREADING MACHINE

Allen T. Ridgeway, Yakima, Wash., assignor of one-fourth to Edward H. O'Boyle and one-fourth to John Ballack, both of Walla Walla, Wash., and one-fourth to Harold R. Pinkerton, Seattle, Wash.

Application December 2, 1947, Serial No. 789,166

3 Claims. (Cl. 10—89)

The present invention relates to certain new and useful improvements in a portable manually usable machine which is adapted to thread small pipes, rods and the like ranging up to three-quarters of an inch in diameter.

More specifically, the invention appertains to a small electric motor having a current conducting cord which may be plugged into any standard house current supply receptacle or the like, the motor housing having a convenient hand grip whereby it may be readily held in the user's hands and said housing being attached to a relatively small casing which houses a gear driven cutter head which latter accomplishes the threading job with requisite expediency.

In carrying out a preferred embodiment of the invention I employ a rotary cutter head for accommodation of selectively usable cutting dies, said cutter head being constructed to embrace a pipe or rod, which is held in a relatively fixed vise, and being mounted in a casing which properly houses it and which is carried on a motor casing in which the source of needed power is situated.

Other objects and advantages will become more readily apparent from the following description and the accompanying illustrative drawings.

In the drawings, wherein like numerals are employed to designate like parts throughout the views.

Figure 1:
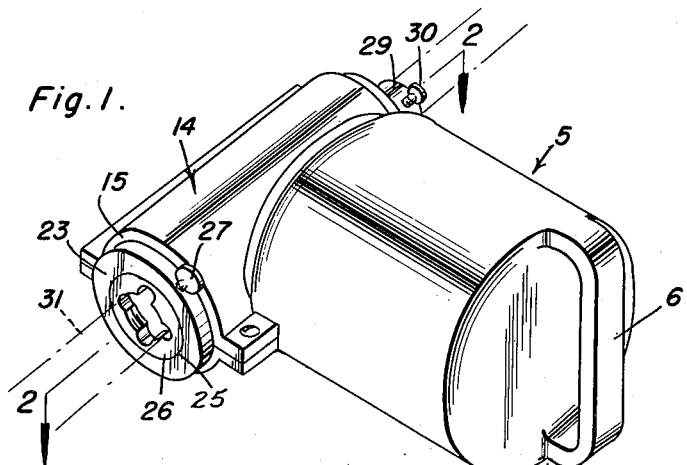
Figure 1 is a perspective view of a portable hand type pipe and rod threader constructed in accordance with this invention.

Referring now to the drawings it will be seen that the invention is characterized essentially by two primary units or parts; namely, the portable electric motor means used, as the source of power, and adapted to be held in the user's hand, and the rotatable cutter head and casing therefor, the latter casing and the motor housing being integrally joined for convenience of both manufacturers and users.

Figure 2:
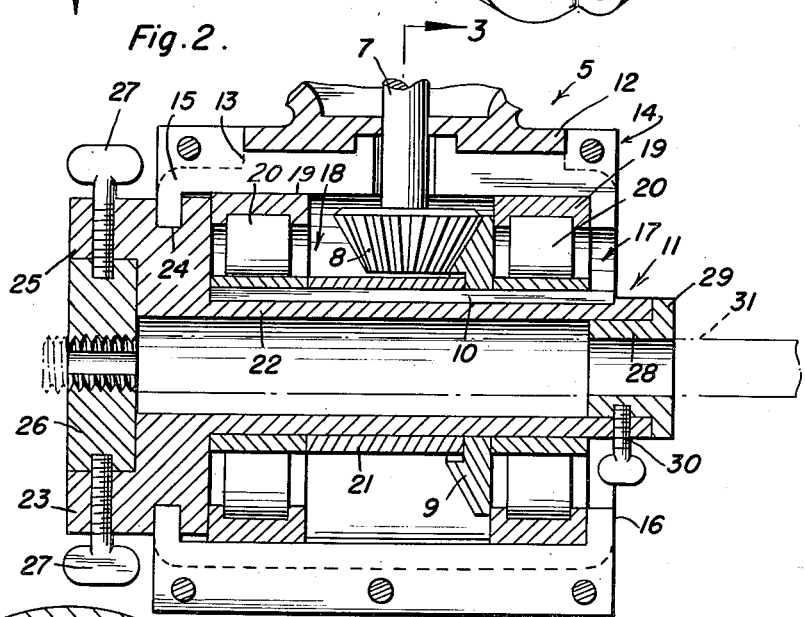
Figure 2 is an enlarged section on the plane of the line 2—2 of Figure 1, looking in the direction of the arrows.
Figure 3:
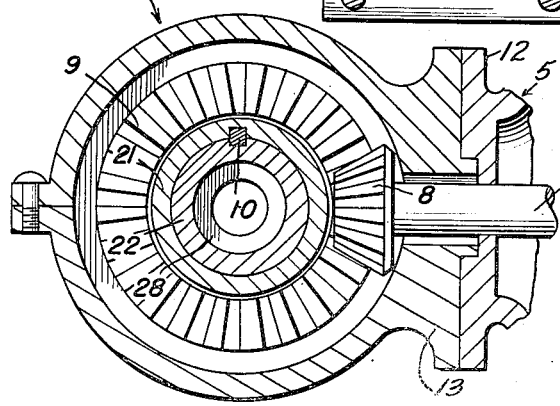
Figure 3 is a cross section on the line 3—3 of Figure 2, looking in the direction of the arrows.

The motor means comprises what may be referred to as a small electric motor 5 which in the present instance has an appropriate hand grip 6 at one end. Extending through the opposite end is the motor shaft 7 carrying a bevelled pinion 8, the latter being in mesh with a bevelled ring gear 9. The ring gear is keyed or otherwise rigidly fastened as at 10 to a rotary cutter or threader device unitarily denoted by the numeral 11 and at right angles to the motor shaft 7. It will be observed in Figure 2 that the motor housing is provided with a flange 12 which is suitably and rigidly secured to an appropriate base or foundation 13 forming a part of the cutter head casing 14, said casing being of cylindrical form and at right angles to the equally cylindrical motor housing and having inturned assembling and retaining flanges 15 and 16 at opposite ends. This casing 14 serves to enclose the gearing described and also is provided with roller or equivalent bearing assemblies 17 and 18, each including a suitable race structure 19 and roller bearing assemblies 20. These bearings are spaced apart by a spacer collar 21 which surrounds the elongated tubular pipe and rod adapter 22, an integral part of the aforementioned rotary cutter head 11. The head proper, which is at the left hand end of the tubular adapter 22, is denoted by the numeral 23 and is grooved as at 24 to accommodate the inner peripheral portion of the inturned flange 15.

The head 23 is provided with a suitably shaped recess 25 to accommodate an insertable and removable die 26 which is held in place by wing-type set screws 27 mounted in the rim or marginal portion of said head. In practice, the dies are standardized to fit the head and vary in size to thread pipes and rods ranging from one-eighth of an inch to approximately three-quarters of an inch in diameter.

The opposite end portion of the barrel or adapter 22 extends through and beyond the right hand end of the casing 14 where it is intended to accommodate insertable and removable friction held bushings 28 of varying sizes, each bushing having an abutment flange 29 and being held in place by a set screw fitting into a groove in the bushing, the set screw being denoted by the numeral 30. The pipe to be cut or threaded is here denoted by the numeral 31 and is shown in place in dotted lines in the drawings. Different sized bushings will be utilized, of course, to accommodate rods and pipes of varying diameters.

In practice the motor or source of power is held by the hand grip 6 in the hand of the user and the pipe cutter or threader is slipped over the pipe or rod to be cut. The latter is held stationary in a vise (not shown) in the usual way and the motor is turned on and the threading operation is carried out by the cutter head turning around the pipe while the motor is held steadily in the hand of the user.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A portable pipe threading machine of the type shown and described comprising a cylindrical open ended gear casing having radially inturned flanges at its opposite open ends, spaced bearing assemblies mounted in said gear casing, one bearing assembly contacting an adjacent inturned flange, a rotary cutter head unit including a head portion having a peripheral groove and recessed to accommodate interchangeable pipe threading dies, the remaining inturned flange projecting into the peripheral groove to assemble said cutter head in place, one of said bearing assemblies being in contact with said head, the latter including an adapter barrel for the pipe which is to be threaded, said barrel being mounted for rotation in said bearing assemblies, a beveled ring gear anchored on said adapter and in contact with an adjacent bearing assembly, a spacing sleeve surrounding said adapter barrel and interposed between the ring gear and the bearing assembly which is in contact with said head, a motor including a handle and a housing, said motor housing being secured to said casing and said motor being provided with a power transmission shaft and said shaft projecting into said casing and having a pinion in operating mesh with said ring gear.

2. The structure specified in claim 1 wherein said spacer and the inner members of the bearing assemblies are keyed to said adapter barrel.

3. A portable pipe threading machine of the type shown and described comprising a cylindrical open-ended gear casing having inturned flanges at opposite open ends, spaced bearing assemblies mounted in said gear casing, one bearing assembly contacting an adjacent inturned flange, a rotary cutter head including a head portion having an exteriorly facing recess to accommodate interchangeable pipe threading dies, the remaining flange being rotatively connected with said cutter head to retain the latter movably in place, one of said bearing assemblies being in contact with said head, the latter including an adapter barrel for the pipe which is to be threaded, said barrel being mounted for rotation in said bearing assemblies, a beveled ring gear anchored on said adapter and in contact with an adjacent bearing assembly, a spacing sleeve surrounding said adapter barrel and interposed between the ring gear and the bearing assembly which is in contact with said head, a motor including a handle and a housing, said motor housing being secured to said casing and said motor being provided with a power transmission shaft and said shaft projecting into said casing and having a pinion in operating mesh with said ring gear.

ALLEN T. RIDGEWAY.

REFERENCES CITED

The following references are of record in the file of this patent:

UNITED STATES PATENTS

| Number | Name | Date |
|---|---|---|
| 1,686,661 | Himes | Oct. 9, 1928 |
| 1,797,076 | Davies | Mar. 17, 1931 |
| 1,852,776 | Hodeaux | Apr. 5, 1932 |
| 1,871,732 | Olmstead | Aug. 16, 1932 |
| 2,205,148 | Mayotte | June 18, 1940 |